(12) United States Patent
Sheahan

(10) Patent No.: US 7,893,675 B2
(45) Date of Patent: Feb. 22, 2011

(54) CURRENT MODE CONTROLLED DC-TO-DC CONVERTER

(75) Inventor: Benjamin Joseph Sheahan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 228 days.

(21) Appl. No.: 12/266,901

(22) Filed: Nov. 7, 2008

(65) Prior Publication Data

US 2010/0117686 A1    May 13, 2010

(51) Int. Cl.
G05F 1/00 (2006.01)
(52) U.S. Cl. ...................................... 323/283
(58) Field of Classification Search .............. 323/224, 323/282, 283
See application file for complete search history.

(56) References Cited

U.S. PATENT DOCUMENTS 5,717,322 A * 2/1998 Hawkes et al. .............. 323/283
5,770,940 A * 6/1998 Goder ........................ 323/282

OTHER PUBLICATIONS

"Average Current Mode Control of Switching Power Supplies," pp. 5-1 through 5-16 (Lloyd Dixon).
"Part V Current-Mode Control Modeling," Designer's Series, 2001 Ridley Engineering, Inc., (Ray Ridley).
"Current-Mode Control, Five Different Types, Used With the Three Basic Classes of Power Converters: Small-Signal AC and Large-Signal DC Characterization, Stability Requirements, and Implementation of Practical Circuits," 16th Annual IEEE Power Electronics Specialists Conference, pp. 771-785 (Richard Redl and Nathan Sokal).
"Current-Mode Modeling for Peak, Valley and Emulated Control Methods," National Semiconductor, pp. 1-92 (Robert Sheehan).
"Current Mode or Voltage Mode," Switching Power Magazine, Oct. 2000, pp. 4-5, Raymond Ridley).
"Emulated Current Mode Control for Buck Regulators Using Sample and Hold Technique," Power Electronics Technology Exhibition and Conference, Oct. 24-26, 2006, pp. 1-49 (Robert Sheehan).

(Continued)

Primary Examiner—Bao Q Vu
Assistant Examiner—Jue Zhang
(74) Attorney, Agent, or Firm—John J. Patti; Wade J. Brady, III; Frederick J. Telecky, Jr.

(57) ABSTRACT

An apparatus having an input voltage and an output voltage is provided. The apparatus comprises a switch that receives the input voltage and that is adapted to be coupled to a load, a modulator having a timing signal, a compensator that is coupled to the modulator and that includes an amplifier, an overcurrent circuit, and a sampler. The modulator is coupled to the switch and the modulator actuates the switch at a first frequency. The amplifier amplifies the difference between at least a portion of the output voltage with a predetermined reference voltage and outputs an amplified voltage. The overcurrent circuit receives the amplified voltage and outputs an overcurrent signal to the modulator. The sampler is interposed between the amplifier and the overcurrent circuit and is coupled to the modulator, where the sampler samples the amplified voltage prior to each actuation of the switch based on the timing signal and where the sampler outputs the compared voltage that was sampled to the overcurrent circuit through the duration of each actuation of the switch.

9 Claims, 3 Drawing Sheets

OTHER PUBLICATIONS

"Instabilities in Current-Mode Controlled Switching Voltage Regulators," 12th Annual IEE Power Electronics Specialists Conference, 1981, pp. 17-28 (Richard Redl and Istvan Novak).

"Loop Gain Crossover Frequency," Switching Power Magazine, Jan. 2001, pp. 22-27 (Ray Ridley).

"Loop Gain Measurement," Switching Power Magazine, 2003, vol. 4, Issue 2, pp. 27-30 (Ray Ridley).

"Modelling, Analysis and Compensation of the Current-Mode Converter," Unitrode Application Note, pp. 3-43 through 3-48 (Unitrode Corporation).

"Near-Optimum Dynamic Regulation of DC-DC Converters Using Feed-Forward of Output Current and Input Voltage With Current-Mode Control," IEEE Transactions on Power Electronics, vol. PE-1, No. 3, Jul. 1986, pp. 191-192.

"Overload -Protection Methods for Switching-Mode DC/DC Converters: Classification, Analysis, and Improvements," 18th Annual IEEE Power Electronics Specialists Conference, 1987, pp. 107-118 (Richard Redl and Nathan Sokal).

"Simple Switching Control Method Changes Power Converter Into a Current Source," 9th Annual IEEE Power Electronics Specialists Conference, 1978, pp. 300-306 (Cecil Deisch).

"Six Common Reasons for Power Supply Instability," Switching Power Magazine, vol. 3, Issue 3, Jul. 2002, pp. 1-8 (Ray Ridley).

"Stability Analysis of Constant-Frequency Current-Mode Controlled Switching Regulators Operating Above 50% Duty Ratio," 13th Annual IEEE Power Electronics Specialists Conference, 1982, pp. 213-223 (Richard Redl and Istvan Novak).

"Superiority of Current-Mode-Control, for Stability Over Wide Ranges of Output Capacitance and ESR," Proceedings of Power Electronics Show and Conference, 1988, pp. 1-17 (Richard Redl and Nathan Sokal).

"What a Design Engineer Should Know About Current-Mode Control," Power Electronics Design Conference, 1985, pp. 1-16 (Richard Redl and Nathan Sokal).

* cited by examiner

CURRENT MODE CONTROLLED DC-TO-DC CONVERTER

TECHNICAL FIELD

The invention relates generally to a power converter and, more particularly, to a DC-to-DC converter.

BACKGROUND

DC-to-DC converters are used in a wide variety of applications. However, one of the many problems that face these converters is sub-harmonic oscillations, which are oscillations in the output voltage and current. These sub-harmonic oscillations can damage equipment and make designing DC-to-DC converters difficult. The impact of sub-harmonic oscillations on the design of DC-to-DC converters is so substantial that there are numerous, recent research efforts to describe this phenomenon theoretically in the hopes of addressing it. Some of these articles describing the research into this phenomenon and into the development of models are as follows: Redl et al., "What a Design Engineer Should Know," *Proceedings Power Electronics Design Conference*, pp. 18-33, 1985; Redl et al., "Superiority of Current-Mode Control for Stability Over a Wide Ranges of Output Capacitances and ESR," *Proceedings of Power Electronics Show and Conference*, pp. 147-163, 1988; Redl et al., "Current-Mode Control, Five different Types, Used With the Three Basic Classes of Power Converters: Small-Signal AC and Classes Large-Signal DC Characterization, Stability Requirements, and Implementation of Practical Circuits," 16$^{th}$ *Annual IEEE Power Electronics Specialists Conference*, pp. 771-785, 1985; Redl et al., "Near-Optimum Dynamic Regulation of DC-DC Converters Using Feedforward of Output Current and Input Voltage With Current-Mode Control," *IEEE Transactions on Power Electronics*, Vol. PE-1, No. 3, pp. 191-192, July 1986; Redl et al., "Stability Analysis of Constant-Frequency Current-Mode Controlled Switching Regulators Operating Above 50% Duty Ratio," 13$^{th}$ *Annual IEEE Power Electronics Specialists Conference*, pp. 212-223, 1982; Redl et al., "Overload-Protection Methods for Switching-Mode DC/DC Converters: Classification, Analysis, and Improvements," 18$^{th}$ *Annual IEEE Power Electronics Specialists Conference*, pp. 107-118, 1987; Redl et al., "Instabilities in Current-Mode Controlled Switching Voltage Regulators," 12$^{th}$ *Annual IEEE Power Electronics Specialists Conference*, pp. 17-28, 1981; Ceisch, Cecil W., "Simple Switching Control Method Changes Power Converter into a Current Source," 9$^{th}$ *Annual IEEE Power Electronics Specialists Conference*, pp. 300-306, 1978; Ridley, Raymond, "Current Mode or Voltage Mode," *Switching Power Magazine*, pp. 4, 5, and 9, October 2000; Ridley, Raymond, "Current Mode Control Modeling," *Switching Power Magazine*, July 2001; Ridley, Raymond, "Six Common Reasons for Power Supply Instability," *Switching Power Magazine*, Vol. 3, No. 3, pp. 6-13, July 2002; Ridley, Raymond, "Loop Gain Crossover Frequency," *Switching Power Magazine*, pp. 22-27, January 2001; Ridley, Raymond, "Loop Gain Measurement with Current Injection," *Switching Power Magazine*, Vol. 4, No. 2, pp. 27-30, May 2003; Sheehan, Robert, "Current-Mode Modeling for Peak, Valley and Emulated Control Methods," *National Semiconductor*; and Sheehan, Robert, "Emulated Current Mode Control for Buck Regulators Using Sample-and-hold Technique," *Power Electronics Technology Exhibition and Conference*, October 2006. None of these articles propose, though, feasible solutions for both continuous and discrete Conduction-Mode operation. As a matter of fact, one of the more recent articles states that "[p]eaking of the closed loop gain due to insufficient slope compensation and ripple on the control voltage can cause sub-harmonic oscillation before the calculated limit, i.e. at duty cycles below 0.5 for peak current mode," indicating the persistence of the problem. Sheehan, Robert, "Emulated Current Mode Control for Buck Regulators Using Sample-and-hold Technique," *Power Electronics Technology Exhibition and Conference*, October 2006.

Clearly, the effort and expense aimed at understanding sub-harmonic oscillations in DC-to-DC converters establishes that there is a long felt need to solve this problem. To date, however, no amenable solution has been developed. This is not to say that others have not attempted to reduce the effect of sub-harmonic oscillations; others have tried and failed. According to a well-known and well-respected consultant and expert in the power electronics industry, Dr. Raymond Ridley, many others have tried and failed. Specifically, Dr. Ridley in an article in *Switching Power Magazine* from October 2000 explains that:

[m]any IC manufacturers have attempted to place all the power supply functions on a single chip, including the current sensing and filtering[, but] . . . they have often found the current-mode noise problems insurmountable and have converted to voltage-mode control . . . [, losing] all inherent advantages of current mode.

Ridley, Raymond, "Current Mode or Voltage Mode," *Switching Power Magazine*, pp. 4, 5, 9, October 2000.

One conventional arrangement is shown in U.S. Pat. Nos. 7,372,238; 7,372,238; 7,045,993; and 7,119,522 by Tomiyoshi. This arrangement employs a sample-and-hold circuit with a DC-to-DC converter, but the sample-and-hold circuit operates almost independently of a clock or oscillator. By not using the clock or oscillator signal, it is more difficult to be able to anticipate switch actuation, which could lead to continued sub-harmonic oscillations. Additionally, a COMP or voltage divided output signal is not sampled; instead, the current across the low-side FET is sampled, which indicates that the circuit of Tomiyoshi would be vulnerable to noise and interference with actuation of the high-side FET. Thus, Tomiyoshi would still exhibit sub-harmonic oscillations stemming from actuation of the high-side FET.

As a result of the research and development efforts to explain and reduce the effects of sub-harmonic oscillations in DC-to-DC converters, there is need for a method and/or apparatus that addresses this phenomenon.

SUMMARY

A preferred embodiment of the present invention, accordingly, provides an apparatus having an input voltage and an output voltage. The apparatus comprises a switch that receives the input voltage and that is adapted to be coupled to a load; a modulator having a timing signal, wherein the modulator is coupled to the switch and wherein the modulator actuates the switch at a first frequency; and a compensator that is coupled to the modulator, wherein the compensator includes: an amplifier that amplifies the difference between at least a portion of the output voltage with a predetermined reference voltage and that outputs an amplified voltage; an overcurrent circuit that receives the amplified voltage and outputs an overcurrent signal to the modulator; and a sampler interposed between the amplifier and the overcurrent circuit and coupled to the modulator, wherein the sampler samples the amplified voltage prior to each actuation of the switch based on the timing signal, and wherein the sampler outputs the compared voltage that was sampled to the overcurrent circuit through the duration of each actuation of the switch.

In accordance with another preferred embodiment of the present invention, the modulator further comprises an oscillator that generates the timing signal; and a latch that receives the timing signal and outputs an actuation signal at the first frequency.

In accordance with another preferred embodiment of the present invention, overcurrent circuit further comprises a voltage-to-current converter; a first FET that is gated by the voltage-to-current converter; a second FET coupled in series with the first FET, wherein the second FET is gated by the actuation signal; and a comparator that receives the voltage from a node between the first and second FETs.

In accordance with another preferred embodiment of the present invention, the latch is an RS latch.

In accordance with another preferred embodiment of the present invention, the compensator further comprises a voltage divider that receives the output voltage.

In accordance with another preferred embodiment of the present invention, the sampler is a sample-and-hold amplifier.

In accordance with another preferred embodiment of the present invention, an apparatus having an input voltage and an output voltage is provided. The apparatus comprises a bridge having a plurality of switches coupled in series to one another, wherein at least one of the switches receives the input voltage; an inductor coupled to the node between two of the switches, wherein the inductor outputs the output voltage; an oscillator that generates a clock signal; a latch that receives the clock signal and that outputs a plurality of actuation signals to the bridge; and a compensator that is coupled to the latch, wherein the compensator includes: an amplifier that amplifies the difference between at least a portion of the output voltage with a predetermined reference voltage and that outputs an amplified voltage; an overcurrent circuit that receives the amplified voltage and outputs an overcurrent signal to the modulator; and a sampler interposed between the amplifier and the overcurrent circuit and coupled to the oscillator, wherein the sampler samples the amplified voltage prior to each actuation of the switch based on the clock signal, and wherein the sampler outputs the compared voltage that was sampled to the overcurrent circuit through the duration of each actuation of the switch.

In accordance with another preferred embodiment of the present invention, a method for reducing a sub-harmonic oscillation in a power source is provided. The method comprises the steps of receiving an input voltage by a switch; generating an actuation signal for the switch by a modulator; amplifying the difference between at least a portion of an output voltage and a predetermined reference voltage; sampling the amplified difference signal prior to each actuation of the switch based on a timing signal from the modulator; outputting the sampled signal prior to each actuation for the duration of the respective actuation of the switch to an overcurrent circuit; and outputting an overcurrent signal to the modulator by the overcurrent circuit.

In accordance with another preferred embodiment of the present invention, the step of generating the actuation signal further comprises generating the timing signal; and setting an RS latch with the timing signal.

In accordance with another preferred embodiment of the present invention, the step of outputting the overcurrent signal further comprises resetting the RS latch with the overcurrent signal.

In accordance with another preferred embodiment of the present invention, an apparatus for reducing a sub-harmonic oscillation in a power source is provided. The method comprises means for receiving an input voltage by a switch; means for generating an actuation signal for the switch by a modulator; means for amplifying the difference between at least a portion of an output voltage and a predetermined reference voltage; means for sampling the amplified difference signal prior to each actuation of the switch based on a timing signal from the modulator; means for outputting the sampled signal prior to each actuation for the duration of the respective actuation of the switch to an overcurrent circuit; and means for outputting an overcurrent signal to the modulator by the overcurrent circuit.

In accordance with another preferred embodiment of the present invention, the means for generating the actuation signal further comprises means for generating the timing signal; and means for setting an RS latch with the timing signal.

In accordance with another preferred embodiment of the present invention, the means for outputting the overcurrent signal further comprises means for resetting the RS latch with the overcurrent signal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
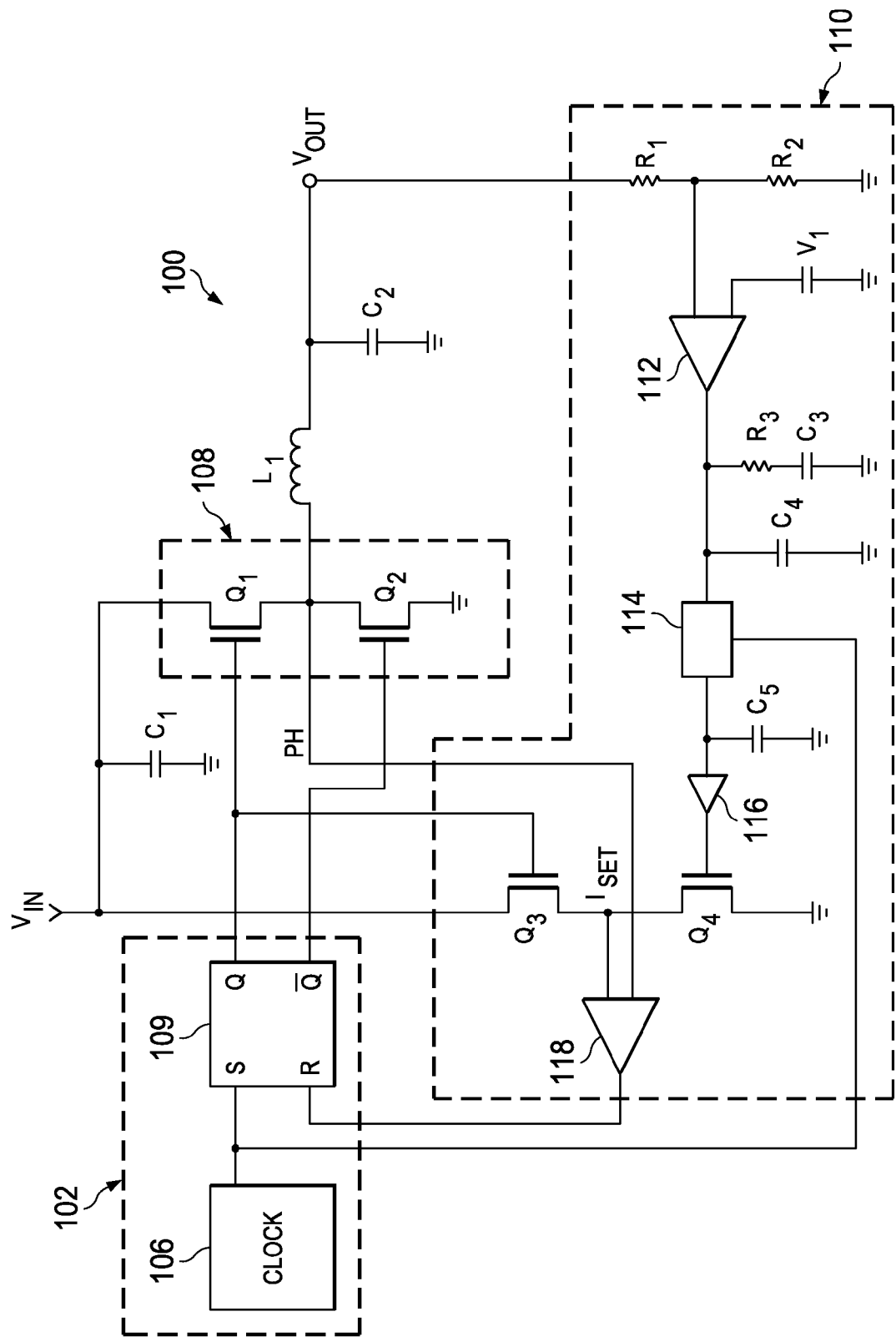
FIG. 1 is a block diagram of a current mode controlled (CMC) DC-to-DC converter in accordance with a preferred embodiment of the present invention.
Figure 2A:
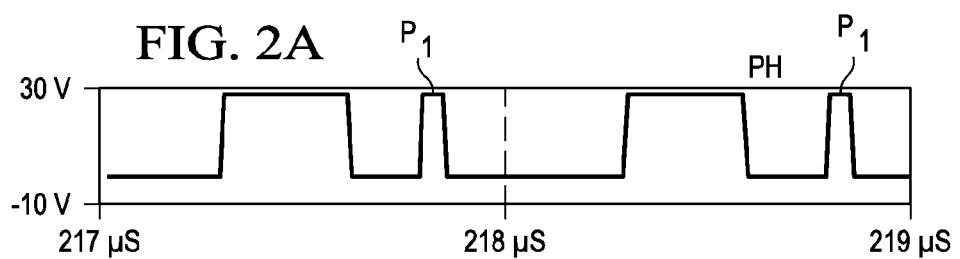
FIG. 2 is a graph depicting sub-harmonic oscillations of the converter of FIG. 2 if the sampler were replaced with a wire.
Figure 2B:
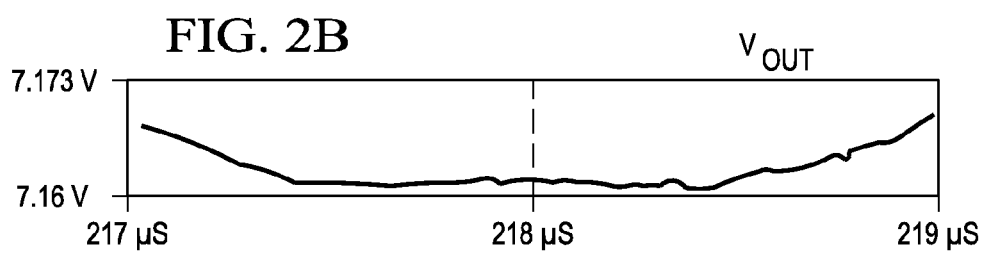
Figure 2C:
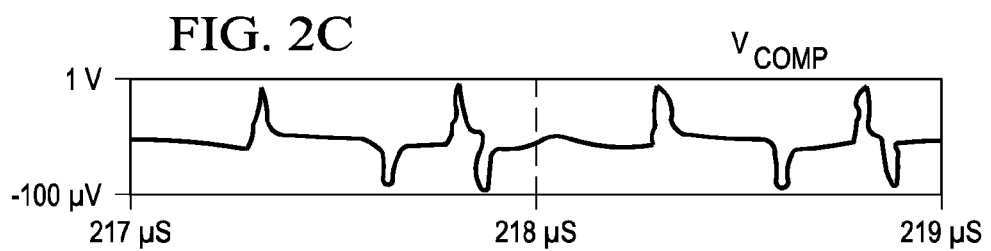
Figure 2D:
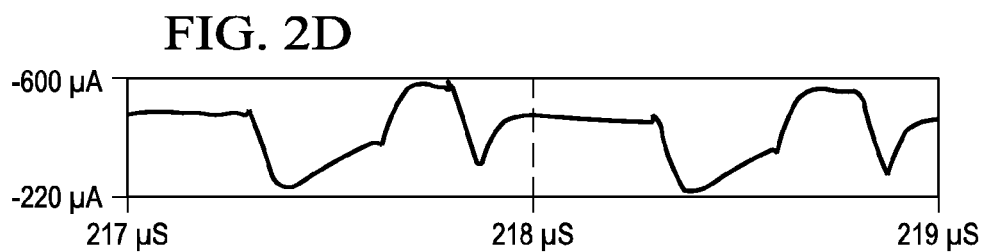
Figure 3A:
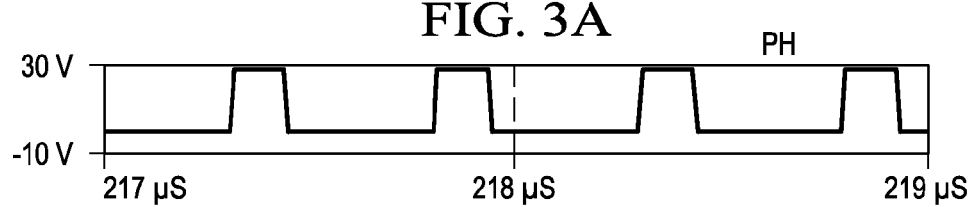
FIG. 3 is a graph depicting the operation of the converter of FIG. 2.
Figure 3B:
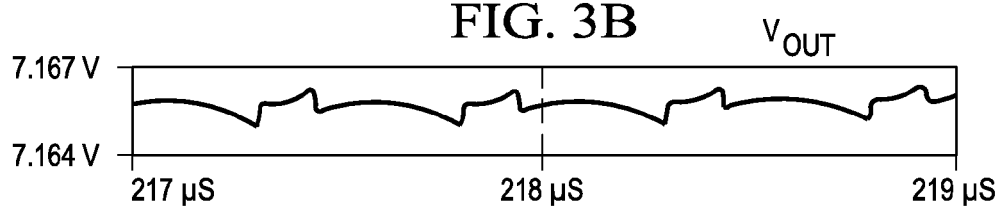
Figure 3C:
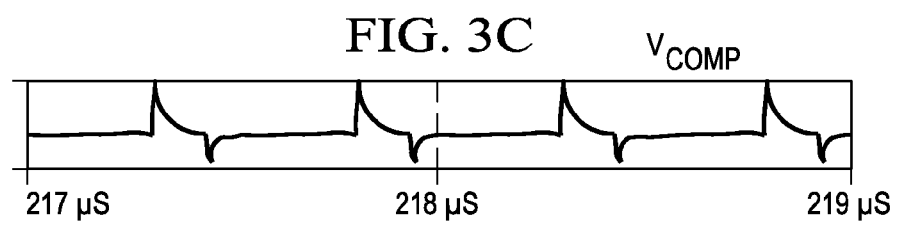
Figure 3D:
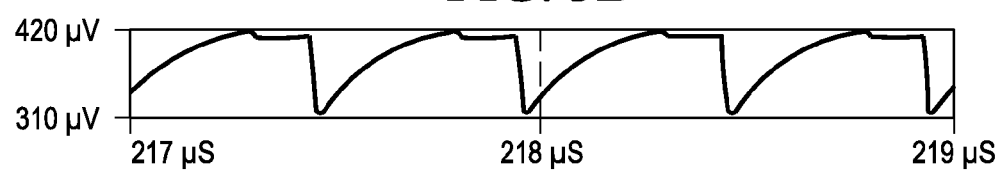

Refer now to the drawings wherein depicted elements are, for the sake of clarity, not necessarily shown to scale and wherein like or similar elements are designated by the same reference numeral through the several views.

Referring to FIG. 1 of the drawings, the reference numeral 100 generally depicts a CMC DC-to-DC converter in accordance with a preferred embodiment of the present invention. As shown, the converter 100 is preferably comprised of several sub-components: a modulator 102, a switching half-bridge 108, an inductor $L_1$, capacitors $C_1$ and $C_2$, and compensator 110.

As with other conventional converters, converter 100 generally operates by providing a switching DC current to an LC combination. With converter 100, the switching is preferably provided by bridge 100. As depicted, the bridge 106 is preferably comprised of two switches $Q_1$ and $Q_2$, which are preferably FETs, in a so-called single phase arrangement; however, it may be possible to employ multiple switching half-bridges in a multi-phase arrangement. The switch $Q_1$ is often referred to as a high-side switch, while switch $Q_2$ is often referred to as a low-side switch. These two switches $Q_1$ and $Q_2$ are coupled in series with one another, where the high-side switch $Q_1$ is preferably coupled to or receives the input voltage $V_{in}$, and the low-side switch $Q_2$ is preferably coupled to ground. Coupled at the node between the switches $Q_1$ and $Q_2$ is the LC combination (comprised of inductor $L_1$ and capacitor $C_2$), which can in turn be coupled to a load.

The switching or actuation signals for the bridge 106 are generally provided by the modulator 102. The modulator 102 preferably generates one or more internal timing signals, where one of which may be a clock signal. As depicted, the modulator 102 is generally comprised of a clock 106 and a latch 109. The clock 106 provides a triggering signal to the latch 109, which causes the inverted and non-inverted outputs of latch 109 to toggle. To cause the bridge 108 to switch as desired, the non-inverted signal gates or controls the high-side switch $Q_1$, and inverted signal controls the low-side switch $Q_2$. Preferably, the clock 106 is a phase locked loop (PLL), and latch 109 is preferably an RS-type.

In operation, the outputs of the modulator 102 are generally square-wave waveforms. When the non-inverted output becomes logic high, switch $Q_1$ is actuated, and current and a voltage (filtered by capacitor $C_1$) are input to the LC combination (inductor $L_1$ and capacitor $C_2$). Then, when the inverted input becomes logic high, switch Q2 is actuated, and current from the LC combination (inductor $L_1$ and capacitor $C_2$) flows to ground. Thus, allowing $V_{out}$ to be at a desired DC level.

In addition to the modulator 102 and bridge 108, a compensator 110 may also BE employed in a feedback-type arrangement. The compensator 110 measures the output voltage $V_{out}$ and provides an overcurrent signal to the latch 109. Preferably, the output voltages $V_{out}$ is divided by the voltage divider $R_1$ and $R_2$ and compared (by amplifier 112) to a predetermined reference voltage $V_1$. The predetermined reference voltage $V_1$ is preferably about 0.8V. Once compared, the output of the amplifier 112 is generally filtered by an RC combination that is generally comprised of resistor $R_3$ and capacitors $C_3$ and $C_4$. The filtered signal can then be transferred through sampler 114 and filtered again by capacitor $C_5$. An overcurrent circuit then generates the overcurrent signal for the latch 109.

The overcurrent signal is generally a reset or triggering signal for latch 109, which causes the latch 109 to toggle. To generate the overcurrent signal, the voltage of the filtered output of sampler 114 can be converted to a current by a voltage-to-current converter 116. The current from converter 116 can be input into the current mirror $Q_4$, and current mirror $Q_4$ is preferably coupled to sense switch $Q_3$ (generally senses actuation of the switch $Q_1$). The sensing switch $Q_3$ and current mirror $Q_4$ are preferably FETs. The sensed output ISET is preferably compared the switch voltage PH by comparator 118 to create the overcurrent signal.

Of interest, however, is the sampler 114. Preferably, the sampler 114 is a sample-and-hold amplifier that utilizes a capacitor-and-switch arrangement with a differential amplifier similar to those employed in Analog-to-Digital Converters (ADCs) or a CMOS FET and capacitor arrangement. This sampler 114, though, is not simply a pass-through device. The sampler 114 generally receives a timing signal from the modulator 102 (preferably, the output clock 106), enabling it to sample-and-hold voltages at desired times in anticipation or advance of a switching event or actuation. Preferably, the sampler 114 samples the filtered output of amplifier 112 prior to the gating or closing of the high-side switch $Q_1$ and holds/outputs that filtered voltage to the overcurrent circuit for the duration of the actuation or during the switching of high-side switch $Q_1$.

One reason for performing this sample-and-hold operation is to reduce the effect of the sub-harmonic oscillations. As noted in the Background section above, sub-harmonic oscillations can be present in DC-to-DC converters, and part of the responsibility for the existence of the sub-harmonic oscillations resides in the feedback portions of converters. If the sampler 114 were to be replaced with a wire, FIG. 2 would depict the effect of sub-harmonic oscillations on the converter 100.

Turning to FIG. 2, a sub-harmonic oscillation can be seen on the output voltage $V_{out}$. Specifically, the output voltage $V_{out}$ and the output current (not shown) are not static, but have a nearly sinusoidal component. This oscillation can be attributed to the narrow pulses $P_1$ on the switch voltage PH. The narrow pulses P1 can, in turn, be attributed to the feedback circuit or compensator 110. The compensator 110 measures the output voltage $V_{out}$ and the noise of actuation of switch $Q_1$. The noise of actuation of switch Q1 helps to create a variation or instability on the output $V_{COMP}$ of the amplifier 112. Small differences in this output $V_{COMP}$ can create drastic variations in the output voltage $V_{out}$ and output current of the converter. For example, the gain can be as high as 9 A/V.

To effectively eliminate the noise of actuation of the switch Q1, the sampler 114 can be employed. Prior to actuation or change of state of the switch Q1, the signal is relatively calm and quiet. By sampling and holding this quiet during actuation of switch Q1, noise resulting from the actuation is not fed back to latch 109. Thus, as can be seen in FIG. 3, the narrow pulses are removed and the sub-harmonic oscillation is effectively reduced.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus having an input voltage and an output voltage, the apparatus comprising:
   a switch that receives the input voltage and that is adapted to be coupled to a load;
   a modulator having a timing signal, wherein the modulator is coupled to the switch and wherein the modulator actuates the switch at a first frequency; and
   a compensator that is coupled to the modulator, wherein the compensator includes:
      an amplifier that amplifies the difference between at least a portion of the output voltage with a predetermined reference voltage and that outputs an amplified voltage;
      an overcurrent circuit that receives the amplified voltage and outputs an overcurrent signal to the modulator, wherein overcurrent circuit includes:
         a voltage-to-current converter;
         a first FET that is gated by the voltage-to-current converter;
         a second FET coupled in series with the first FET, wherein the second FET is gated by an actuation signal from the modulator; and a comparator that receives the voltage from a node between the first and second FETs; and a sampler interposed between the amplifier and the overcurrent circuit and coupled to the modulator, wherein the sampler samples the amplified voltage prior to each actuation of the switch based on the timing signal, and wherein the sampler outputs the compared voltage that was sampled to the overcurrent circuit through the duration of each actuation of the switch.

2. The apparatus of claim 1, wherein the modulator further comprises:

an oscillator that generates the timing signal; and a latch that receives the timing signal and outputs the actuation signal at the first frequency.

3. The apparatus of claim 2, wherein the latch is an RS latch.

4. The apparatus of claim 1, wherein the compensator further comprises a voltage divider that receives the output voltage.

5. The apparatus of claim 1, wherein the sampler is a sample-and-hold amplifier.

6. An apparatus having an input voltage and an output voltage, the apparatus comprising:

a bridge having a plurality of switches coupled in series to one another, wherein at least one of the switches receives the input voltage;

an inductor coupled to the node between two of the switches, wherein the inductor outputs the output voltage;

an oscillator that generates a clock signal;

a latch that receives the clock signal and that outputs a plurality of actuation signals to the bridge; and a compensator that is coupled to the latch, wherein the compensator includes:

an amplifier that amplifies the difference between at least a portion of the output voltage with a predetermined reference voltage and that outputs an amplified voltage;

an overcurrent circuit that receives the amplified voltage and outputs an overcurrent signal to the modulator, wherein overcurrent circuit includes:

a voltage-to-current converter;

a first FET that is gated by the voltage-to-current converter;

a second FET coupled in series with the first FET, wherein the second FET is gated by at least one of the plurality of actuation signals; and a comparator that receives the voltage from a node between the first and second FETs; and a sampler interposed between the amplifier and the overcurrent circuit and coupled to the oscillator, wherein the sampler samples the amplified voltage prior to each actuation of the switch based on the clock signal, and wherein the sampler outputs the compared voltage that was sampled to the overcurrent circuit through the duration of each actuation of the switch.

7. The apparatus of claim 6, wherein the latch is an RS latch.

8. The apparatus of claim 6, wherein the compensator further comprises a voltage divider that receives the output voltage.

9. The apparatus of claim 6, wherein the sampler is a sample-and-hold amplifier.

* * * * *